(12) United States Patent
Tseng et al.

(10) Patent No.: US 10,103,676 B2
(45) Date of Patent: Oct. 16, 2018

(54) FAN MOTOR BRAKING APPARATUS AND THE CONTROL METHOD THEREOF

(71) Applicant: Delta Electronics, Inc., Taoyuan (TW)

(72) Inventors: Wei-Shuo Tseng, Taoyuan (TW); Chia-Feng Wu, Taoyuan (TW); Yi-Chieh Cho, Taoyuan (TW); Yun-Hua Chao, Taoyuan (TW); Po-Tsun Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/335,804

(22) Filed: Oct. 27, 2016

(65) Prior Publication Data
US 2018/0034405 A1  Feb. 1, 2018

(30) Foreign Application Priority Data

Jul. 26, 2016  (CN) .......................... 2016 1 0595028

(51) Int. Cl.
| | |
|---|---|
| H02P 3/12 | (2006.01) |
| H02P 27/08 | (2006.01) |
| F04D 25/06 | (2006.01) |
| F04D 27/00 | (2006.01) |
| H02P 6/08 | (2016.01) |
| H02P 6/16 | (2016.01) |
| H02P 6/24 | (2006.01) |

(52) U.S. Cl.
CPC .............. *H02P 27/08* (2013.01); *F04D 25/06* (2013.01); *F04D 27/004* (2013.01); *H02P 6/085* (2013.01); *H02P 6/16* (2013.01); *H02P 6/24* (2013.01); *F05D 2260/903* (2013.01)

(58) Field of Classification Search
CPC ...... H02P 3/12; H02P 3/14; H02P 3/22; H02P 21/36
USPC .... 318/612, 56, 57, 60, 63, 86, 134, 400.09, 318/757, 759
See application file for complete search history.

(56) References Cited

U.S. PATENT DOCUMENTS

| | | | |
|---|---|---|---|
| 6,157,153 A * | 12/2000 | Uegami ................. | G11B 19/22 318/269 |
| 9,712,089 B2 * | 7/2017 | Gohara .................... | H02P 3/22 |
| 2008/0048598 A1 * | 2/2008 | Shibuya ................. | H02P 6/185 318/400.1 |
| 2009/0045762 A1 * | 2/2009 | Hayashi ................... | H02P 7/28 318/379 |

(Continued)

*Primary Examiner* — Bickey Dhakal
(74) *Attorney, Agent, or Firm* — Muncy, Geissler, Olds & Lowe, P.C.

(57) ABSTRACT

A fan motor braking apparatus includes a fan motor, a conversion circuit and a motor driver circuit. The conversion circuit is respectively and electrically connected to the fan motor and the motor driver circuit. The conversion circuit includes bridge structures. After the fan motor starts operating, the motor driver circuit receives at least one fan status signal and determines whether the fan motor braking apparatus enters a braking status or not according to the at least one fan status signal. When the fan motor braking apparatus enters the braking status, the motor driver circuit outputs a braking control signal to the conversion circuit so that the bridge structures of the conversion circuit generate a brake effect on fan motor, wherein the at least one fan status signal includes an external speed-control signal and a transition voltage signal of the fan motor.

16 Claims, 19 Drawing Sheets

(56) References Cited

U.S. PATENT DOCUMENTS

| | | | |
|---|---|---|---|
| 2010/0225263 A1* | 9/2010 | Mishima | H02P 1/18 318/430 |
| 2012/0262097 A1* | 10/2012 | Yamato | H02P 6/08 318/400.04 |
| 2015/0084557 A1* | 3/2015 | Nishi | H02P 1/029 318/400.11 |
| 2015/0188459 A1* | 7/2015 | Tseug | H02P 3/22 318/365 |
| 2015/0326151 A1* | 11/2015 | Ogawa | H02P 3/22 318/703 |

* cited by examiner

FAN MOTOR BRAKING APPARATUS AND THE CONTROL METHOD THEREOF

CROSS REFERENCE TO RELATED APPLICATION

The present application is based on, and claims priority from, China Application Number 201610595028.3, filed on Jul. 26, 2016, the invention of which is hereby incorporated by reference herein in its entirety.

TECHNICAL FIELD

The disclosure relates to a fan motor braking apparatus, and more particularly to brake protection when the fan is in a locked status or in a low speed mode.

BACKGROUND

In applications that use a fan motor, the proper operation of the fan motor can be affected by the surrounding environment. For example, return air occurs around the fan motor causing the fan motor to be unable to start smoothly, or the return air may result in a reversion in the fan motor, or the ambient temperature may get so high that the fan motor is unable to cool down. In view of this, a fan motor braking apparatus and a control method thereof are provided,

SUMMARY

An embodiment of the present disclosure provides a fan motor braking apparatus. The fan motor braking apparatus comprises a fan motor, a conversion circuit and a motor driving IC. The conversion circuit is electrically connected to the fan motor and comprises a plurality of bridge structures. The motor driving IC is electrically connected to the conversion circuit and receives at least one fan status signal, wherein after the fan motor starts operating, the motor driving IC determines whether the fan motor braking apparatus is in a brake status or not according to the fan status signals; wherein when the fan motor braking apparatus is in the brake status, the motor driving IC outputs a brake control signal to the conversion circuit so that the bridge structures of the conversion circuit turn on to stop the fan motor; and wherein the fan status signals comprise an external speed-control signal or at least one conversion voltage signal from the fan motor.

An embodiment of the present disclosure provides a control method applied in a fan motor braking apparatus. The control method comprises receiving at least one fan status signal after the fan motor of the fan motor braking apparatus starts operating; determining whether the fan motor braking apparatus is in a brake status or not according to the fan status signals; and when the fan motor braking apparatus is in the brake status, outputting a brake control signal to a conversion circuit of the fan motor braking apparatus so that a plurality of bridge structures of the conversion circuit turn on to stop the fan motor, wherein the fan status signals comprise an external speed-control signal or at least one conversion voltage signal from the fan motor.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

A fan motor braking apparatus of the present invention uses signal pins of a motor driving integrated circuit (IC) of a fan to detect the status of the fan and uses the detection result to determine whether or not to turn on a brake function that protects the fan motor. Conditions under which the brake function may be switched on include the fan having just been powered on; when the fan motor stops operating; when the fan motor is in a low-speed mode; when the fan is running in reverse; and when the fan is locked.

Figure 1A:
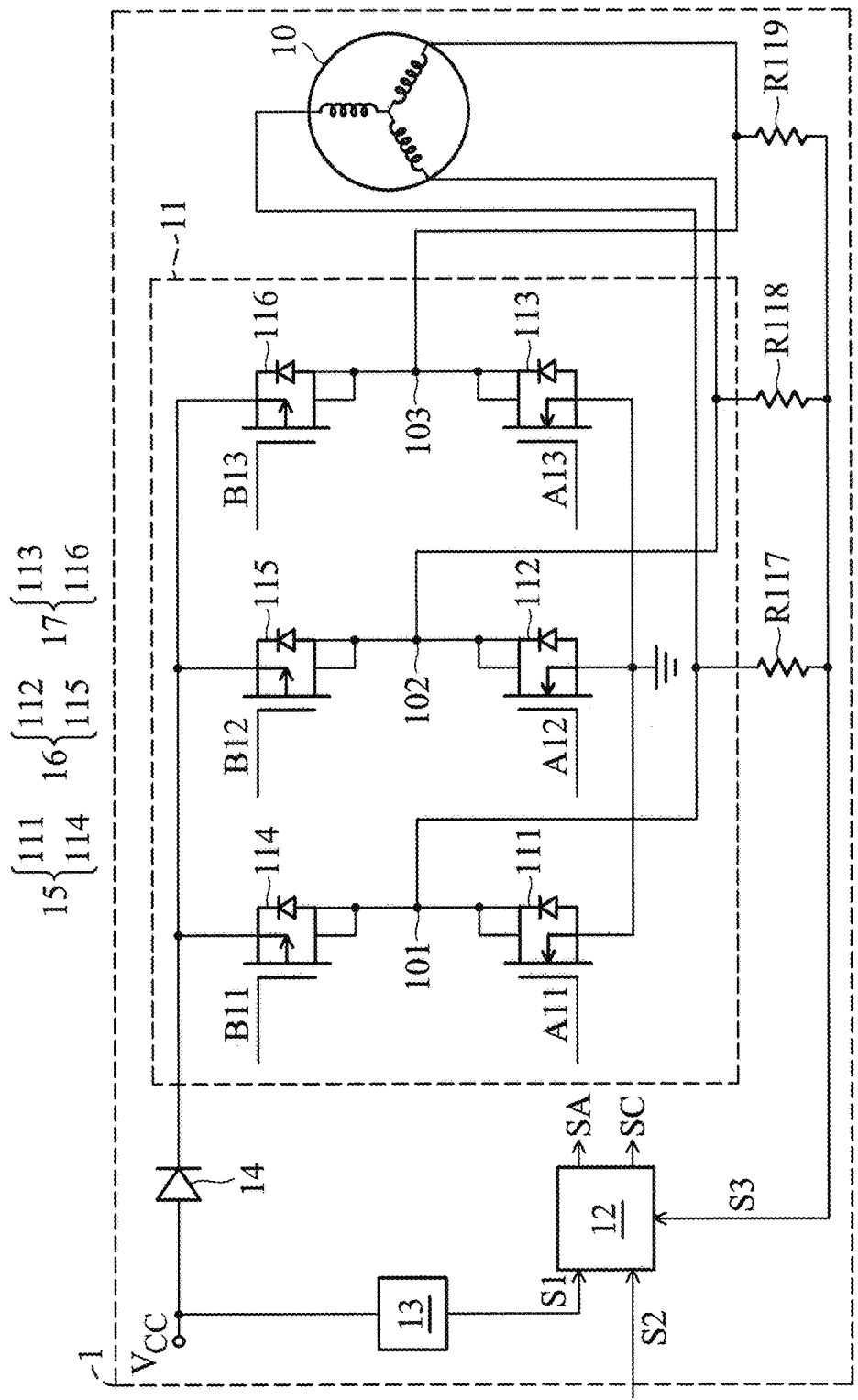
FIG. 1A shows a block diagram of a fan motor braking apparatus 1 according to a first embodiment of the present disclosure.

FIG. 1A shows a block diagram of a fan motor braking apparatus 1 according to a first embodiment of the present disclosure. In the first embodiment, the fan motor braking apparatus 1 comprises a fan motor 10, a conversion circuit 11, a motor driving IC 12, a buck circuit 13 and a diode 14. The conversion circuit 11 is connected to the fan motor 10, the motor driving IC 12 and the diode 14. An external DC voltage source $V_{CC}$ is provided to the conversion circuit 11 through the diode 14 for converting electric power required by the fan motor 10. The buck circuit 13 reduces the voltage provided from the external DC voltage source $V_{CC}$ to provide the electric power required by the motor driving IC 12 (i.e. a supply voltage signal S1 in FIG. 1A).

In the first embodiment, the fan motor 10 is a three-phase motor. Accordingly, the conversion circuit 11 comprises a first bridge structure 15, a second bridge structure 16 and a third bridge structure 17. The fan motor 10 is electrically connected to an upper bridge switch unit 114 and a lower bridge switch unit 111 of the first bridge structure 15 through a node 101, electrically connected to an upper bridge switch unit 115 and a lower bridge switch unit 112 of the second bridge structure 16 through a node 102, and electrically connected to an upper bridge switch unit 116 and a lower bridge switch unit 113 of the third bridge structure 17 through a node 103.

It should be noted that there is no Hall sensor in the fan motor 10 of the first embodiment. In the first embodiment, the motor driving IC 12 is respectively and electrically connected to the nodes 101, 102 and 103 through resistors 117, 118 and 119 so that the motor driving IC 12 samples resistors 117, 118 and 119 to obtain a phase voltage signal U, a phase voltage signal V and a phase voltage signal W.

In the first embodiment, the motor driving IC 12 is electrically connected to a gate B11 of the upper bridge switch unit 114 and a gate A11 of the lower bridge switch unit 111 of the first bridge structure 15, a gate B12 of the upper bridge switch unit 115 and a gate A12 of the lower bridge switch unit 112 of the second bridge structure 16, and a gate B13 of the upper bridge switch unit 116 and a gate A13 of the lower bridge switch unit 113 of the third bridge structure 17. When the fan motor braking apparatus 1 is in the brake status, the motor driving IC 12 outputs a brake control signal SC to the gates A11, A12 and A13 of lower bridge switch units 111~113 of the conversion circuit 11. Or, in another embodiment, When the fan motor braking apparatus 1 is in the brake status, the motor driving IC 12 outputs the brake control signal SC to the gates B11, B12 and B13 of upper bridge switch units 114~116 of the conversion circuit 11. At this time, the first bridge structure 15, the second bridge structure 16 and the third bridge structure 17 turn on to generate a braking effect on the fan motor 10.

In the first embodiment, when the fan motor braking apparatus 1 is in the brake status, the voltage levels of the brake control signal SC and the gates A11, A12, A13, B11, B12 and B13 can be in condition 1 or condition 2 shown in Table 1 below,

TABLE 1

| | SC | A11 | A12 | A13 | B11 | B12 | B13 |
|---|---|---|---|---|---|---|---|
| Condition 1 | High (HI) | High | High | High | Low (LO) | Low | Low |
| Condition 2 | High | Low | Low | Low | High | High | High |

In the first embodiment, when the fan motor braking apparatus 1 is powered on, the motor driving IC 12 detects the supply voltage signal S1 of the buck circuit 13 of the fan motor braking apparatus 1. If the motor driving IC 12 detects that the voltage level of the supply voltage signal S1 is increased from low (LO) to high (HI), the motor driving IC 12 outputs the brake control signal SC to the conversion circuit 11 to switch on the brake function (i.e. the voltage level of the brake control signal SC is increased from low to high (LO→HI)).

In the first embodiment, after the fan motor braking apparatus 1 is powered on, the motor driving IC 12 detects at least one fan status signal to determine whether to switch on the brake function or not, wherein the fan status signals comprise an external speed-control signal S2 or at least one conversion voltage signal S3 from the fan motor 10.

Figure 1B:
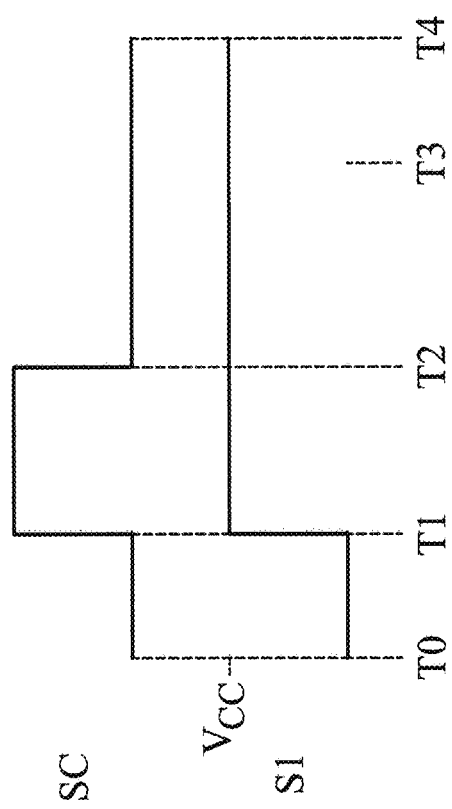
FIG. 1B illustrates an operation processing mode of a brake control signal SC and a supply voltage signal S1 according to the first embodiment of the present disclosure.

FIG. 1B illustrates that the motor driving IC 12 switches on the brake function when the fan is powered on according to the first embodiment of the present disclosure, wherein an operation processing mode of the brake control signal SC and the supply voltage signal S1 is shown in FIG. 1B. In the first embodiment, when the fan motor 10 is not powered on, the motor driving IC 12 has detected the supply voltage signal S1 of the buck circuit 13 of the fan motor braking apparatus 1. As shown in FIG. 1B, the supply voltage signal S1 is at a low voltage level from time T0 to time T1 (T0-T1: Power Off Stage). At time T1, the fan motor braking apparatus 1 is just powering on, the voltage level of the supply voltage signal S1 is increased from low to high (LO→HI) to switch on the fan motor 10. Since the motor driving IC 12 has detected that the voltage level of the supply voltage signal S1 is increased from low to high, the motor driving IC 12 outputs the brake control signal SC to the conversion circuit 11. Accordingly, the fan motor 10 is in the brake status from time T1 to time T2 (T1-T2: Brake Stage), i.e. the voltage level of the brake control signal SC is increased from low to high. Between time T2 and time T3 (T2-T3: Soft Start Stage), the fan motor 10 leaves the brake status (i.e. the voltage level of the brake control signal SC is dropped from high to low (HI→LO)) to perform a soft start (for example, achieving a default speed after time period T2-T3=3-15 sec). From time T3 to time T4 (After T3: Normal Operation Stage), the fan motor 10 is in an operating status with the default speed.

Figure 1C:
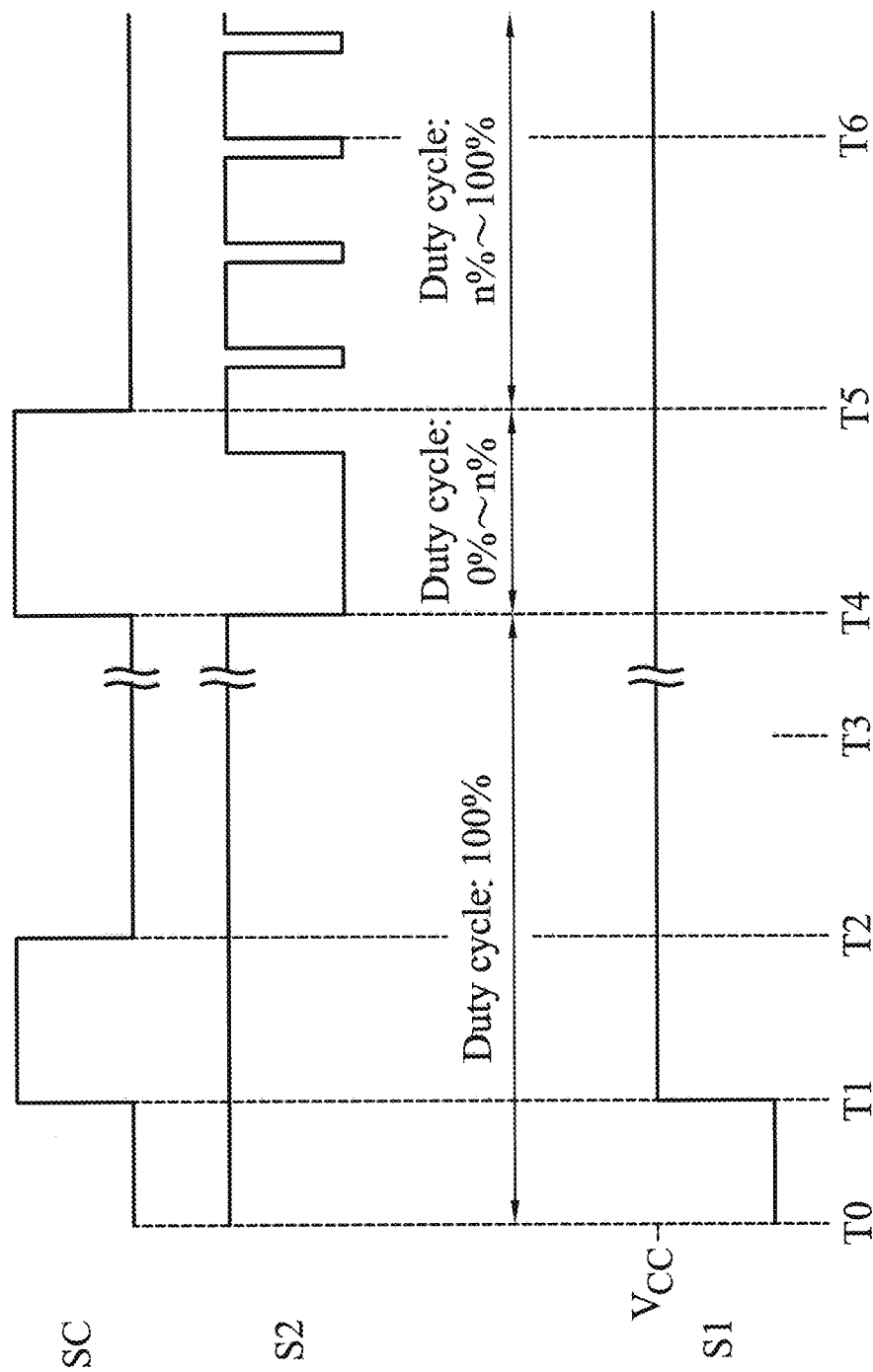
FIG. 1C illustrates an operation processing mode of the brake control signal SC, a speed-control signal S2 of a pulse signal with positive duty cycles, and the supply voltage signal S1 according to the first embodiment of the present disclosure.

FIG. 1C illustrates that the motor driving IC 12 switches on the brake function when the motor driving IC 12 detects that the speed-control signal S2 is in a stop status (0 RPM)

or the duty cycle of the speed-control signal S2 is less than n % according to the first embodiment of the present disclosure, wherein an operation processing mode of the brake control signal SC, the speed-control signal S2 of a pulse signal with positive duty cycles, and the supply voltage signal S1 is shown in FIG. 1C. In FIG. 1C, the speed-control signal S2 can be a pulse width modulation (PWM) signal from outside the fan motor braking apparatus 1 such as a PWM signal from a server, from a personal computer, from an NB, or from a storage device.

From time T0 to time T4, the motor driving IC 12 detects that the duty cycle of the speed-control signal S2 is always larger than a first duty cycle (n %) (Such as 15%, but the present invention is not limited thereto). The brake control signal SC does not change with the speed-control signal S2. At this time, operation of the fan motor is the same as in FIG. 1B.

Then the motor driving IC 12 detects that the duty cycle of the speed-control signal S2 is less than the first duty cycle (n %) from time T4 to time T5. Accordingly, at time T4, the motor driving IC 12 outputs the brake control signal SC to the conversion circuit 11 so that the fan motor 10 is in the brake status from time T4 to time T5.

Then the motor driving IC 12 detects that the duty cycle of the speed-control signal S2 is larger than the first duty cycle (n %) after time T5. Accordingly, at time T5, the motor driving IC 12 stops outputting the brake control signal SC (Or the logic level or voltage level of the brake control signal SC output by the motor driving IC 12 changes from high to low) to the conversion circuit 11 so that the fan motor 10 leaves the brake status. Then the fan motor 10 performs a soft start (for example, achieving the default speed after time period T5-T6=3-15 sec). After time T6, the fan motor 10 is in the operating status with the default speed.

Accordingly, in FIG. 1C, the relationship between the brake control signal SC and the speed-control signal S2 after time T4 is shown in Table 2 below.

TABLE 2

| Brake control signal SC | Speed-control signal S2 |
| --- | --- |
| High voltage level | Duty cycle is less than n % |
| Low voltage level | Duty cycle is larger than n % |

Figure 1D:
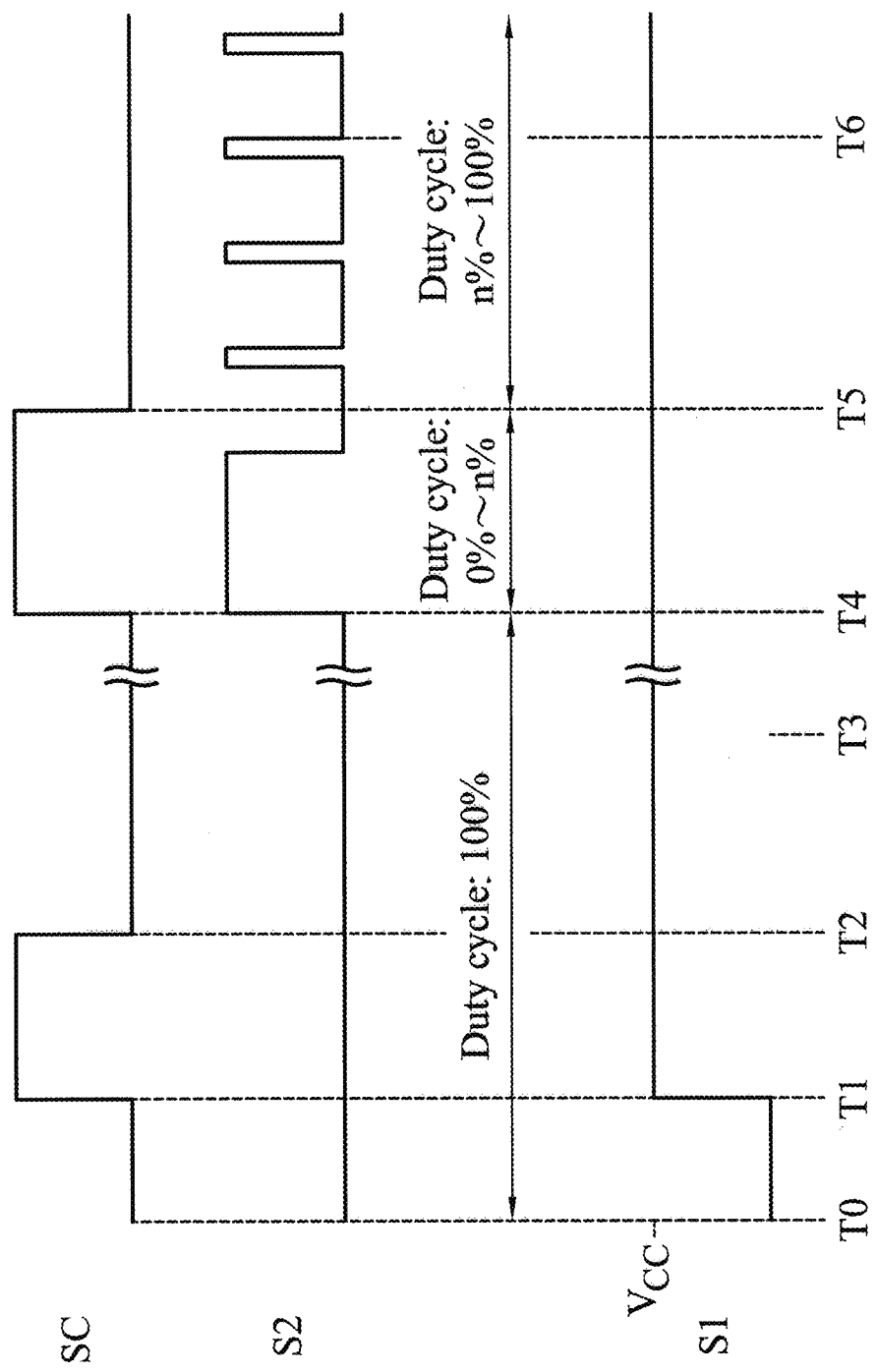
FIG. 1D illustrates an operation processing mode of the brake control signal SC, the speed-control signal S2 of a pulse signal with negative duty cycles, and the supply voltage signal S1 according to the first embodiment of the present disclosure.

FIG. 1D illustrates an operation processing mode of the brake control signal SC, the speed-control signal S2, and the supply voltage signal S1 according to the first embodiment of the present disclosure. In FIG. 1D, the operations of the fan motor 10 are the same as the operations of the fan motor 10 described in FIG. 1C. The only difference is that the speed-control signal S2 in FIG. 1D operates at a negative operating voltage. At this time, the motor driving IC 12 detects the ratio of negative operating voltage of the speed-control signal S2 to determine the duty cycle of the speed-control signal S2. Accordingly, in FIG. 1D, the relationship between the brake control signal SC and the speed-control signal S2 is shown in Table 2 above.

Figure 1E:
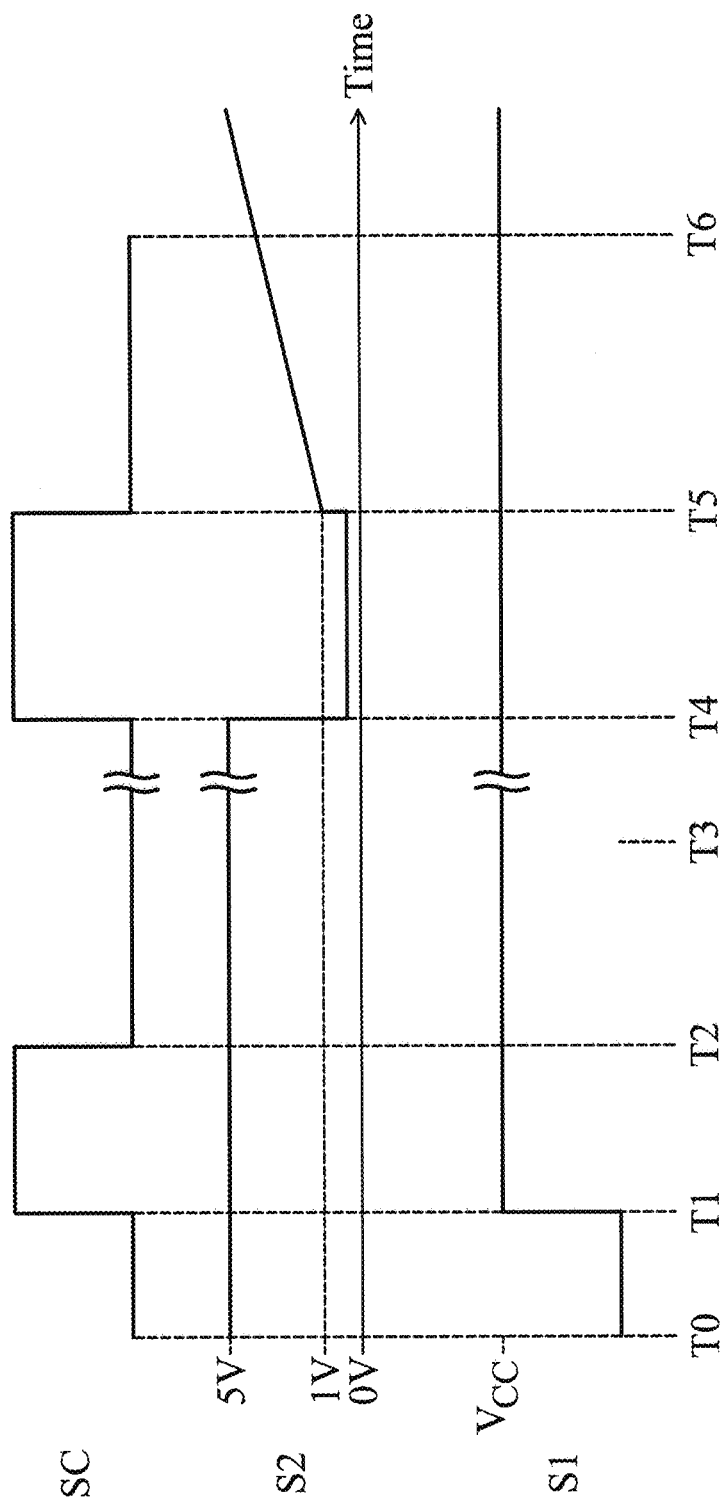
FIG. 1E illustrates an operation processing mode of the brake control signal SC, the speed-control signal S2 with a low voltage level, and the supply voltage signal S1 according to the first embodiment of the present disclosure.

FIG. 1E illustrates an operation processing mode of the brake control signal SC, the speed-control signal S2 with a low voltage level, and the supply voltage signal S1 according to the first embodiment of the present disclosure. In FIG. 1E, the speed-control signal S2 is from outside the fan motor braking apparatus 1 such as from an analog-to-digital converter, from a heat sensor, from a light sensor, from a vibration sensor or from a humidity sensor, and the speed-control signal S2 is a detection voltage signal. From time T0 to time T4, the operations of the fan motor 10 in FIG. 1E are the same as the operations of the fan motor 10 described in FIG. 1C. In FIG. 1E, the motor driving IC 12 detects that the voltage level of the speed-control signal S2 is between 0 volts and a first voltage (such as 0 V~1V) from time T4 to time T5. Accordingly, at time T4, the motor driving IC 12 outputs the brake control signal SC to the conversion circuit 11 so that the fan motor 10 is in the brake status.

After time T5, the motor driving IC 12 detects that the voltage level of the speed-control signal S2 is higher than the first voltage. Accordingly, at time T5, the motor driving IC 12 stops outputting the brake control signal SC (Or the logic level or voltage level of the brake control signal SC output by the motor driving IC 12 changes from high to low) to the conversion circuit 11 so that the fan motor 10 leaves the brake status. Then the fan motor 10 performs a soft start from time T5 to time T6. After time T6, the fan motor 10 is in the operating status.

Accordingly, in FIG. 1E, the relationship between the brake control signal SC and the speed-control signal S2 after time T4 is shown in Table 3 below.

TABLE 3

| Brake control signal SC | Speed-control signal S2 |
| --- | --- |
| High voltage level | Between 0 V and the first voltage |
| Low voltage level | higher than the first voltage |

Figure 1F:
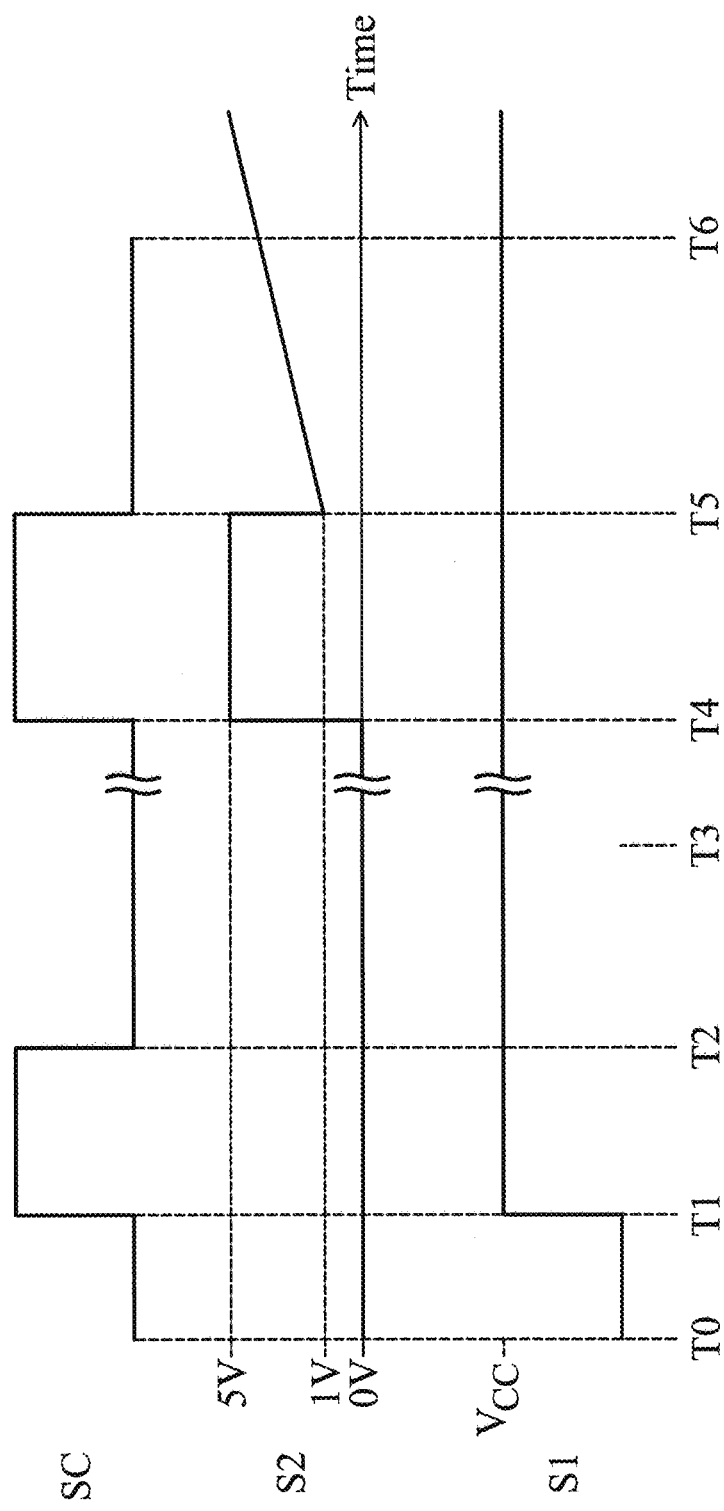
FIG. 1F illustrates an operation processing mode of the brake control signal SC, the speed-control signal S2 with a high voltage level, and the supply voltage signal S1 according to the first embodiment of the present disclosure.

FIG. 1F illustrates an operation processing mode of the brake control signal SC, the speed-control signal S2, and the supply voltage signal S1 according to the first embodiment of the present disclosure. In FIG. 1F, operations of the fan motor 10 are the same as the operations of the fan motor 10 described in FIG. 1E. The only difference is that when the motor driving IC 12 detects that the voltage level of the speed-control signal S2 is between a second voltage and a maximum voltage (such as 4V~5V), the motor driving IC 12 outputs the brake control signal SC to the conversion circuit 11 so that the fan motor 10 is in the brake status. Conversely, when the motor driving IC 12 detects that the voltage level of the speed-control signal S2 is between 0 volts and the second voltage, the motor driving IC 12 stops outputting the brake control signal SC (Or the logic level or voltage level of the brake control signal SC output by the motor driving IC 12 changes from high to low) to the conversion circuit 11 so that the fan motor 10 leaves the brake status.

Accordingly, in FIG. 1F, the relationship between the brake control signal SC and the speed-control signal S2 after time T4 is shown in Table 4 below.

TABLE 4

| Brake control signal SC | Speed-control signal S2 |
| --- | --- |
| High voltage level | Between the second voltage and the maximum voltage |
| Low voltage level | lower than the second voltage |

Accordingly, as shown in FIG. 1E and FIG. 1F, a sensor from outside the fan motor braking apparatus 1 (such as the analog-to-digital converter, the heat sensor, the light sensor, the vibration sensor or the humidity sensor) can adjust the speed-control signal S2 according to its sensing information so that the motor driving IC 12 controls the fan motor 10 being in the brake status. For example, when the ambient temperature sensed by the heat sensor from outside the fan motor braking apparatus 1 is too high, the motor driving IC 12 controls the fan motor 10 being in the brake status. For example, when the vibration sensor from outside the fan motor braking apparatus 1 detects that the fan motor 10 is vibrating intensely, the vibration sensor changes the speed-control signal S2 output to the motor driving IC 12 so that the fan motor 10 is in the brake status. For example, when the humidity sensor from outside the fan motor braking apparatus 1 detects that the humidity of the fan motor 10 is too high, the humidity sensor changes the speed-control signal S2 output to the motor driving IC 12 so that the fan motor 10 is in the brake status.

Figure 1G:
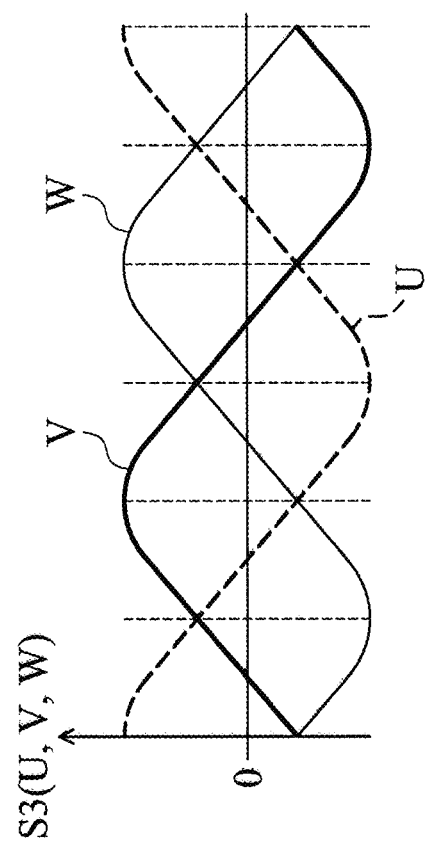
FIG. 1G illustrates a waveform diagram of a conversion voltage signal S3 while the fan motor 10 is operating according to the first embodiment of the present disclosure.
Figure 1H:
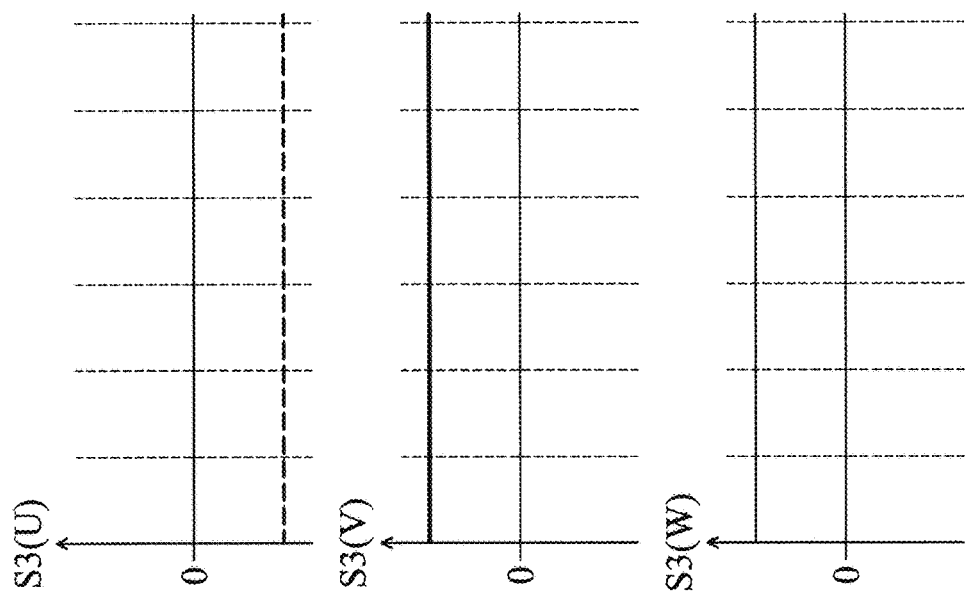
FIG. 1H illustrates a waveform diagram of the conversion voltage signal S3 while the fan motor 10 is in a locked status according to the first embodiment of the present disclosure.

In FIG. 1G and FIG. 1H, the phase voltage signal U, the phase voltage signal V and the phase voltage signal W respectively represent three conversion voltage signals S3 of the fan motor 10. FIG. 1G illustrates a waveform diagram of a conversion voltage signal S3 while the fan motor 10 operates according to the first embodiment of the present disclosure. In FIG. 1G, the fan motor is in the operating status. Thus voltage levels of the phase voltage signal U, the phase voltage signal V and the phase voltage signal W change with time.

FIG. 1H illustrates a waveform diagram of the conversion voltage signals S3 while the fan motor 10 is in a locked status according to the first embodiment of the present disclosure. In FIG. 1H, since the fan motor 10 is in the locked status, the phase voltage signal U, the phase voltage signal V and the phase voltage signal W do not change with time. At this time, the voltage levels of the phase voltage signal U, the phase voltage signal V and the phase voltage signal W stay constant.

When the fan motor 10 is in the locked status, probable conditions of the phase voltage signal U, the phase voltage signal V and the phase voltage signal are listed in Table 5 below:

TABLE 5

In the locked states the fan motor of conversion voltage signal S3

| | phase voltage signal U | phase voltage signal V | phase voltage signal W |
| --- | --- | --- | --- |
| Condition 1 | High constant voltage | High constant voltage | Low constant voltage |
| Condition 2 | High constant voltage | Low constant voltage | High constant voltage |
| Condition 3 | Low constant voltage | High constant voltage | High constant voltage |

Wherein the conversion voltage signals S3 of FIG. 1H are shown in the condition 3 of Table 5.

Figure 1I:
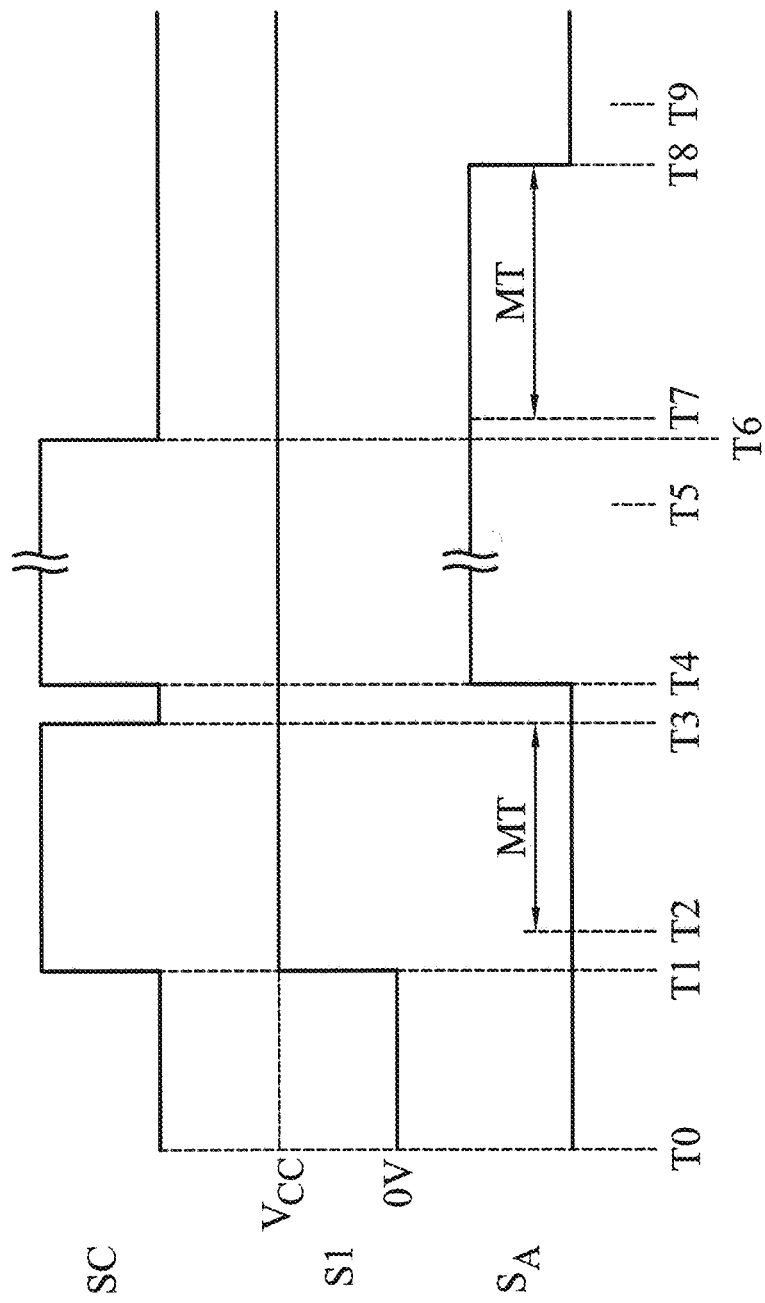
FIG. 1I illustrates an operation processing mode of the brake control signal SC, the supply voltage signal S1, and the conversion voltage signal S3 according to the first embodiment of the present disclosure.

FIG. 1I illustrates an operation processing mode of the brake control signal SC, the supply voltage signal S1, and the conversion voltage signal S3 according to the first embodiment of the present disclosure. In FIG. 1I, the driving IC 12 determines, according to the supply voltage signal S1 and the conversion voltage signal S3, the voltage level of an alert signal SA output by itself. In the first embodiment, if the fan motor 10 is always not in the locked status, then the voltage level of the alert signal SA stays at a low voltage level. For example, if the fan motor 10 is operating and mechanical failure does not occur in the fan motor 10, then the voltage level of the alert signal SA stays at a low voltage level. From time T0 to time T1, the voltage level of the supply voltage signal S1 stays at a low voltage level, i.e. the fan motor 10 is not in the operating status. At time T1, the voltage level of the supply voltage signal S1 is increased from low to high.

From time T1 to time T2, the driving IC 12 detects that the voltage level of the conversion voltage signals S3 (the phase voltage signal U, the phase voltage signal V and the phase voltage signal W) are not changed within the detection period (i.e. time T1 to time T2). Thus the driving IC 12 determines the fan motor 10 is in the locked status. Meanwhile, the driving IC 12 informs the fan motor 10 to be in the brake status. After a Mask time (i.e. time T2 to time T3 (Restart) such as 10 sec), the driving IC 12 detects voltage level of the conversion voltage signals S3 (such as the phase voltage signal U, the phase voltage signal V and the phase voltage signal W shown in FIG. 1H) again at time T3.

At time T4, since the driving IC 12 detects that the voltage level of the conversion voltage signals S3 (the phase voltage signal U, the phase voltage signal V and the phase voltage signal W) are not changed within the detection period (i.e. time T3 to time T4 (Restart)), the driving IC 12 determines that the fan motor 10 is in the locked status. At this time, the driving IC 12 informs the fan motor 10 to be in the brake status again. Since the driving IC 12 determines the fan motor 10 is in the locked status once again by detecting the conversion voltage signals S3, the driving IC 12 enhances the voltage level of the alert signal SA is alarmed from low to high. The triggered high voltage level of the alert signal SA represents that the voltage level of the conversion voltage signals S3 has not been changed in a long time (longer than the Mask time MT), i.e. the fan motor is in the locked status for a long time.

At time T5, the fan motor 10 leaves the brake status such as a condition of the mechanical failure being removed at time T5. Then, from time T6 to time T7, the driving IC 12 restarts the detection and detects that the voltage level of the conversion voltage signals S3 (the phase voltage signal U, the phase voltage signal V and the phase voltage signal W) are changed within the detection period (i.e. time T6 to time T7).

From time T7 to time T8, the fan motor 10 is always in the operating status and the driving IC 12 goes through another Mask time (i.e. time T7 to time T8 such as 10 sec). At time T8, the driving IC 12 determines that the fan motor 10 is in the operating status once again by detecting the conversion voltage signals S3 (such as the phase voltage signal U, the phase voltage signal V and the phase voltage signal W shown in FIG. 1G are detected by the driving IC 12). Therefore the driving IC 12 decreases the voltage level of the alert signal SA is released from high to low.

Figure 2A:
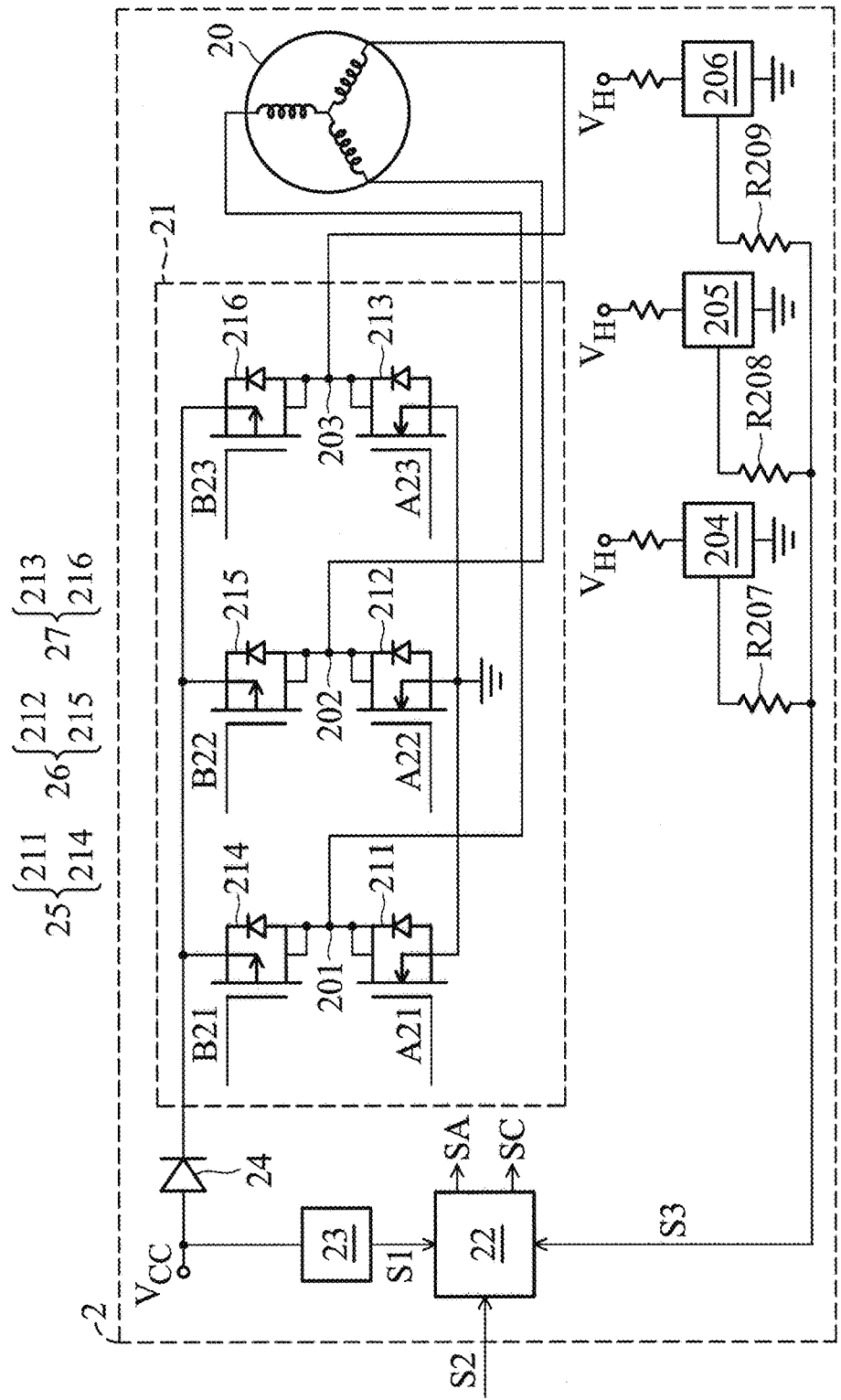
FIG. 2A shows a block diagram of a fan motor braking apparatus 2 according to a second embodiment of the present disclosure.

FIG. 2A shows a block diagram of a fan motor braking apparatus 2 according to a second embodiment of the present disclosure. In the second embodiment, the fan motor braking apparatus 2 comprises a fan motor 20, a conversion circuit 21, a motor driving IC 22, a buck circuit 23 and a diode 24. The conversion circuit 21 is connected to the fan motor 20, the motor driving IC 22 and the diode 24. An external DC voltage source $V_{CC}$ is provided to the conversion circuit 21 through the diode 24 for converting electric power required by the fan motor 20. The buck circuit 23 reduces the voltage provided from the external DC voltage source $V_{CC}$ to provide electric power required by the motor driving IC 22 (i.e. the supply voltage signal S1 in FIG. 2A).

In the second embodiment, the fan motor 20 is a three-phase motor. Accordingly, the same as conversion circuit 11, the conversion circuit 21 of the fan motor braking apparatus 2 comprises a first bridge structure 25, a second bridge structure 26 and a third bridge structure 27. The fan motor 20 is also electrically connected to an upper bridge switch unit 214 and a lower bridge switch unit 211 of the first bridge structure 25 through a node 201, electrically connected to an upper bridge switch unit 215 and a lower bridge switch unit 212 of the second bridge structure 26 through a node 202, and electrically connected to an upper bridge switch unit 216 and a lower bridge switch unit 213 of the third bridge structure 27 through a node 203.

The same as the fan motor braking apparatus 1, the motor driving IC 22 is electrically connected to a gate B21 of the upper bridge switch unit 214 and a gate A21 of the lower bridge switch unit 211 of the first bridge structure 25, a gate B22 of the upper bridge switch unit 215 and a gate A22 of the lower bridge switch unit 212 of the second bridge structure 26, and a gate B23 of the upper bridge switch unit 216 and a gate A23 of the lower bridge switch unit 213 of the third bridge structure 127. When the fan motor braking apparatus 2 is in the brake status, the motor driving IC 22 outputs a brake control signal SC to the gates A21, A22 and A23 of the lower bridge switch units 211~213 of the conversion circuit 21. Or, in another embodiment, When the fan motor braking apparatus 2 is in the brake status, the motor driving IC 22 outputs the brake control signal SC to the gates B21, B22 and B23 of the upper bridge switch units 214~216 of the conversion circuit 21. At this time, the first bridge structure 25, the second bridge structure 26 and the third bridge structure 27 turn on to generate a braking effect on the fan motor 20.

In the second embodiment, when the fan motor 20 of the fan motor braking apparatus 2 is in the brake status, the voltage levels of the brake control signal SC and the gates A21, A22, A23, B21, B22 and B23 can be in condition 1 or condition 2 shown in Table 6 below.

TABLE 6

| | SC | A21 | A22 | A23 | B21 | B22 | B23 |
|---|---|---|---|---|---|---|---|
| Condition 1 | High (HI) | High | High | High | Low (LO) | Low | Low |
| Condition 2 | High | Low | Low | Low | High | High | High |

Unlike the fan motor 10 of the first embodiment, the fan motor 20 of the fan motor braking apparatus 2 further comprises a first Hall sensor 204, a second Hall sensor 205 and a third Hall sensor 206. In the second embodiment, the driving IC 22 is electrically connected to the first Hall sensor 204, the second Hall sensor 205 and the third Hall sensor 206 respectively through the resistor 207, the resistor 208 and the resistor 209 so that the driving IC 22 obtains three conversion voltage signals S3 of the fan motor 20 sampled from the resistor 207, the resistor 208 and the resistor 209.

The same as the first embodiment, when the fan motor braking apparatus 2 is powered on, the motor driving IC 22 detects a supply voltage signal S1 of the buck circuit 23 of the fan motor braking apparatus 2. If the motor driving IC 22 detects that the voltage level of the supply voltage signal S1 is increased from low to high (LO→HI), the motor driving IC 22 outputs the brake control signal SC (i.e. voltage level of the brake control signal SC is increased from low to high (LO→HI)) to the conversion circuit 22 to switch on the brake function.

In the second embodiment, the operations of the supply voltage signal S1 shown in FIG. 1B of the first embodiment in the fan motor braking apparatus 1 can also be applied to the fan motor braking apparatus 2 of the second embodiment.

The same as the first embodiment, after the fan motor braking apparatus 2 is powered on, the motor driving IC 22 detects at least one fan status signal to determine whether to switch on the brake function or not, wherein the fan status signals comprise an external speed-control signal S2 or at least one conversion voltage signal S3 from the fan motor 20.

In the second embodiment, operations of the external speed-control signal S2 shown in FIG. 1C, FIG. 1D, FIG. 1E and FIG. 1F of the first embodiment in the fan motor braking apparatus 1 can also be applied to the fan motor braking apparatus 2 of the second embodiment. Similarly, operations of the conversion voltage signal S3 shown in FIG. 1I of the first embodiment in the fan motor braking apparatus 1 can also be applied to the fan motor braking apparatus 2 of the second embodiment.

Figure 2B:
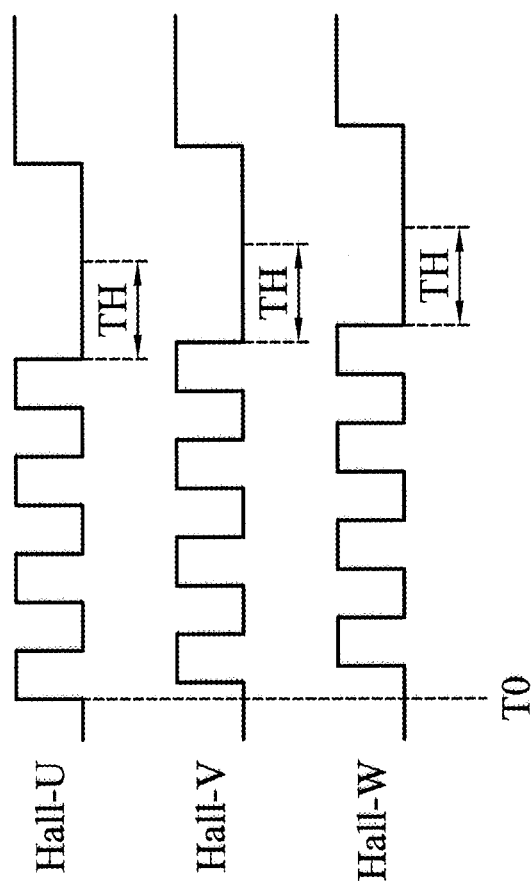
FIG. 2B illustrates how the driving IC 22 detects the conversion voltage signal S3 (output time of the Hall signals) according to the second embodiment of the present disclosure.
Figure 2C:
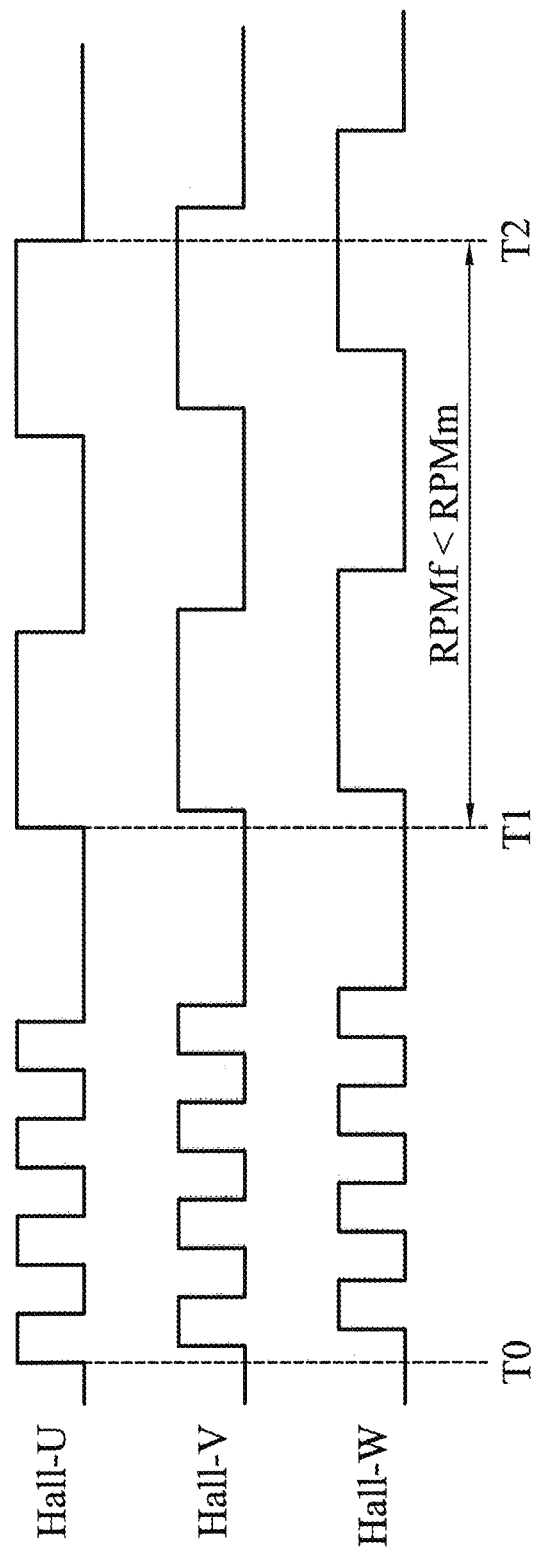
FIG. 2C illustrates how the driving IC 22 detects the conversion voltage signal S3 (speed of the Hall signals) according to the second embodiment of the present disclosure.

In FIG. 2B and FIG. 2C, the three conversion voltage signals S3 of the fan motor 20 are respectively represented as a first Hall signal Hall-U, a second Hall signal Hall-V and a third Hall signal Hall-W.

FIG. 2B illustrates how the driving IC 22 detects the conversion voltage signals S3 (the first Hall signal Hall-U, the second Hall signal Hall-V and the third Hall signal Hall-W) according to the second embodiment of the present disclosure. When the fan motor 20 is in the locked status (such as the condition of the mechanical failure occurring), the first Hall signal Hall-U sampled from the first Hall sensor 204, the second Hall signal Hall-V sampled from the second Hall sensor 205 and the third Hall signal Hall-W sampled from the third Hall sensor 206 do not change with time. Accordingly, as shown in FIG. 2B, if the motor driving IC 22 detects that the three conversion voltage signals S3 have no change in voltage during a detection period TH, then the motor driving IC 22 outputs the brake control signal SC to the conversion circuit 21 so that the fan motor 20 is in the brake status.

When the fan motor 20 operates, rotor positions of the fan motor 20 change with time. At this time, the first Hall signal Hall-U sampled from the first Hall sensor 204, the second Hall signal Hall-V sampled from the second Hall sensor 205 and the third Hall signal Hall-W sampled from the third Hall sensor 206 change with time. Accordingly, if the motor driving IC 22 detects that the three conversion voltage signals S3 have changes in voltage during the detection period TH, then the motor driving IC 22 keeps the brake control signal SC at a low voltage level. Hence the motor driving IC 22 determines whether the fan motor 20 is in the locked status or not by detecting voltage changes in the three conversion voltage signals S3 during the detection period TH.

FIG. 2C illustrates how the driving IC 22 detects the conversion voltage signals S3 (the first Hall signal Hall-U, the second Hall signal Hall-V and the third Hall signal Hall-W) according to the second embodiment of the present disclosure. In FIG. 2C, the driving IC 22 obtains the first Hall signal Hall-U, the second Hall signal Hall-V and the third Hall signal Hall-W to determine a fan speed RPMf of the fan motor 20.

As shown in FIG. 2C, from time T0 to time T1, the driving IC 22 detects the conversion voltage signals S3 (the first Hall signal Hall-U, the second Hall signal Hall-V and the third Hall signal Hall-W) to obtain the fan speed RPMf. At this time, the driving IC 22 keeps the brake control signal SC at a low voltage level in order not to switch on the brake function.

From time T1 to time T2, the driving IC 22 detects the three conversion voltage signals S3 to obtain that the fan speed RPMf is lower than a minimum fan speed RPMmin. At this time, the driving IC 22 determines that the fan motor 20 is in the locked status. Since the fan motor 20 is in the locked status, the driving IC 22 enhances the voltage level of the brake control signal SC from low to high (LO→HI) and outputs the brake control signal SC to the conversion circuit 21 so that the fan motor 20 is in the brake status. Hence the driving IC 22 of FIG. 2C detects the three conversion voltage signals S3 to determine the fan speed RPMf, and determines whether the fan motor 20 is in the locked status or not according to the fan speed RPMf.

Figure 3A:
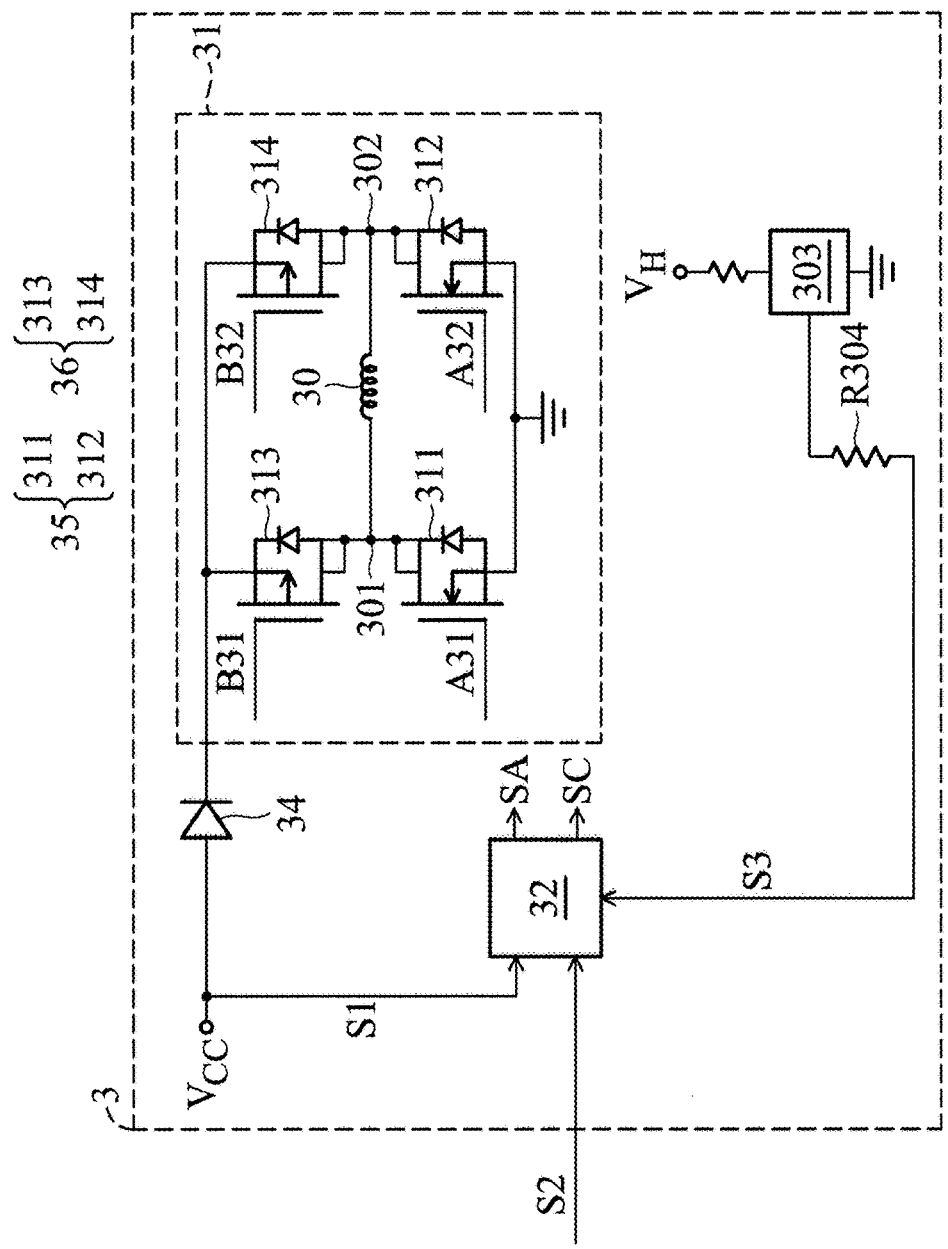
FIG. 3A shows a block diagram of a fan motor braking apparatus 3 according to a third embodiment of the present disclosure.

FIG. 3A shows a block diagram of a fan motor braking apparatus 3 according to a third embodiment of the present disclosure. In the third embodiment, the fan motor braking apparatus 3 comprises a fan motor 30, a conversion circuit 31, a motor driving IC 32 and a diode 34. The conversion circuit 31 is connected to the fan motor 30, the motor driving IC 32 and the diode 34. An external DC voltage source $V_{CC}$ is provided to the conversion circuit 31 through the diode 34 for converting electric power required by the fan motor 30, and the external DC voltage source $V_{CC}$ also provides electric power (i.e. the supply voltage signal S1 in FIG. 3A) required by the motor driving IC 32.

Unlike the fan motors of the first and second embodiments, the fan motor 30 is a single-phase motor. The conversion circuit 31 of the fan motor braking apparatus 3 comprises a first bridge structure 35 and a second bridge structure 36. The fan motor 30 is electrically connected to an upper bridge switch unit 313 and a lower bridge switch unit 311 of the first bridge structure 35 through a node 301 and electrically connected to an upper bridge switch unit 314 and a lower bridge switch unit 312 of the second bridge structure 36 through a node 302.

Similar to the fan motor braking apparatus 1, when the fan motor braking apparatus 3 is in the brake status, the motor driving IC 32 outputs a brake control signal SC to a gate A31 of the lower bridge switch unit 311 and a gate A32 of the lower bridge switch unit 312 of the conversion circuit 31. Or, in another embodiment, When the fan motor braking apparatus 3 is in the brake status, the motor driving IC 32 outputs the brake control signal SC to a gate B31 of the upper bridge switch unit 313 and a gate B32 of the upper bridge switch unit 314 of the conversion circuit 31. At this time, the first bridge structure 35 and the second bridge structure 36 both turn on to generate a braking effect on the fan motor 30.

In the third embodiment, when the fan motor 30 of the fan motor braking apparatus 3 is in the brake status, the voltage levels of the brake control signal SC and the gates A31, A32, B31 and B32 can be in condition 1 or condition 2 shown in Table 7 below.

TABLE 7

|  | SC | A31 | A32 | B31 | B32 |
|---|---|---|---|---|---|
| Condition 1 | High (HI) | High | High | Low (LO) | Low |
| Condition 2 | High | Low | Low | High | High |

Figure 3B:
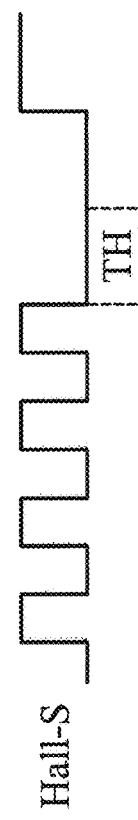
FIG. 3B illustrates how the driving IC 32 detects the conversion voltage signal S3 (output time of the Hall signals) according to the third embodiment of the present disclosure.
Figure 3C:
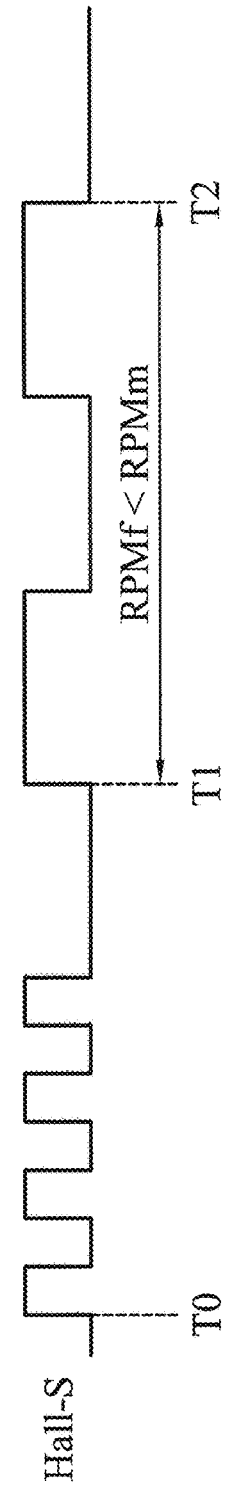
FIG. 3C illustrates how the driving IC 32 detects the conversion voltage signal S3 (speed of the Hall signals) according to the third embodiment of the present disclosure.

Similar to the fan motor 20 of the second embodiment, the fan motor braking apparatus 3 further comprises a Hall sensor 303. In the third embodiment, the driving IC 32 is electrically connected to the Hall sensor 303 through the resistor 304 so that the driving IC 32 obtains a conversion voltage signal S3 of the fan motor 30 sampled from the resistor 303. In FIG. 3B and FIG. 3C of the third embodiment, the conversion voltage signal S3 of the fan motor 30 is represented as a Hall signal Hall-S.

The same as the first embodiment, when the fan motor braking apparatus 3 is powered on, the motor driving IC 32 detects a supply voltage signal S1 of the fan motor braking apparatus 3. If the motor driving IC 32 detects that the voltage level of the supply voltage signal S1 is increased from low to high (LO→HI), the motor driving IC 32 outputs the brake control signal SC (i.e. voltage level of the brake control signal SC is increased from low to high (LO→HI)) to the conversion circuit 31 to switch on the brake function.

In the third embodiment, operations of the supply voltage signal S1 shown in FIG. 1B of the first embodiment in the fan motor braking apparatus 1 can also be applied to the fan motor braking apparatus 3 of the third embodiment.

The same as the first embodiment, after the fan motor braking apparatus 3 is powered on, the motor driving IC 32 detects at least one fan status signal to determine whether to switch on the brake function or not, wherein the fan status signals comprise an external speed-control signal S2 or at least one conversion voltage signal S3 from the fan motor 30.

In the third embodiment, operations of the external speed-control signal S2 shown in FIG. 1C, FIG. 1D, FIG. 1E and FIG. 1F of the first embodiment in the fan motor braking apparatus 1 can also be applied to the fan motor braking apparatus 3 of the third embodiment. Similarly, operations of the conversion voltage signal S3 shown in FIG. 1I of the first embodiment in the fan motor braking apparatus 1 can also be applied to the fan motor braking apparatus 3 of the third embodiment.

FIG. 3B illustrates how the driving IC 32 detects the conversion voltage signal S3 (the Hall signal Hall-S) according to the third embodiment of the present disclosure. In the third embodiment, when the fan motor 30 is in the locked status (such as the condition of a mechanical failure occurring), the Hall signal Hall-S sampled from the Hall sensor 303 does not change with time. Accordingly, as shown in FIG. 3B, if the motor driving IC 32 detects that the conversion voltage signal S3 (the Hall signal Hall-S) has no change in voltage during a detection period TH, then the motor driving IC 32 outputs the brake control signal SC to the conversion circuit 31 so that the fan motor 30 is in the brake status.

In the third embodiment, if the motor driving IC 32 detects that the conversion voltage signal S3 (the Hall signal Hall-S) has changes in voltage during the detection period TH, then the motor driving IC 32 keeps the brake control signal SC at a low voltage level. Hence the motor driving IC 32 determines whether the fan motor 30 is in the locked status or not by detecting voltage changes in the conversion voltage signal S3 (the Hall signal Hall-S) during the detection period TH.

FIG. 3C illustrates how the driving IC 32 detects the conversion voltage signal S3 (speed of the Hall signals) according to the third embodiment of the present disclosure. In FIG. 3C of the third embodiment, the driving IC 32 obtains the conversion voltage signal S3 (the Hall signal Hall-S) to determine the fan speed RPMf of the fan motor 30. In other words, the driving IC 32 of FIG. 3C detects the conversion voltage signal S3 (the Hall signal Hall-S) to determine the fan speed RPMf, and determines whether the fan motor 30 is in the locked status or not according to the fan speed RPMf.

As shown in FIG. 3C, from time T0 to time T1, the driving IC 32 detects that the fan speed RPMf is faster than a default minimum fan speed RPMmin, the driving IC 32 keeps the brake control signal SC at a low voltage level. From time T1 to time T2, the driving IC 32 detects the conversion voltage signal S3 (the Hall signal Hall-S) to determine that the fan speed RPMf is lower than the minimum fan speed RPMmin. Accordingly, the driving IC 32 determines the fan motor 30 is in the locked status. Since the fan motor 30 is in the locked status, the driving IC 32 enhances the voltage level of the brake control signal SC from low to high (LO→HI) and outputs the brake control signal SC to the conversion circuit 31 so that the fan motor 30 is in the brake status.

Figure 4:
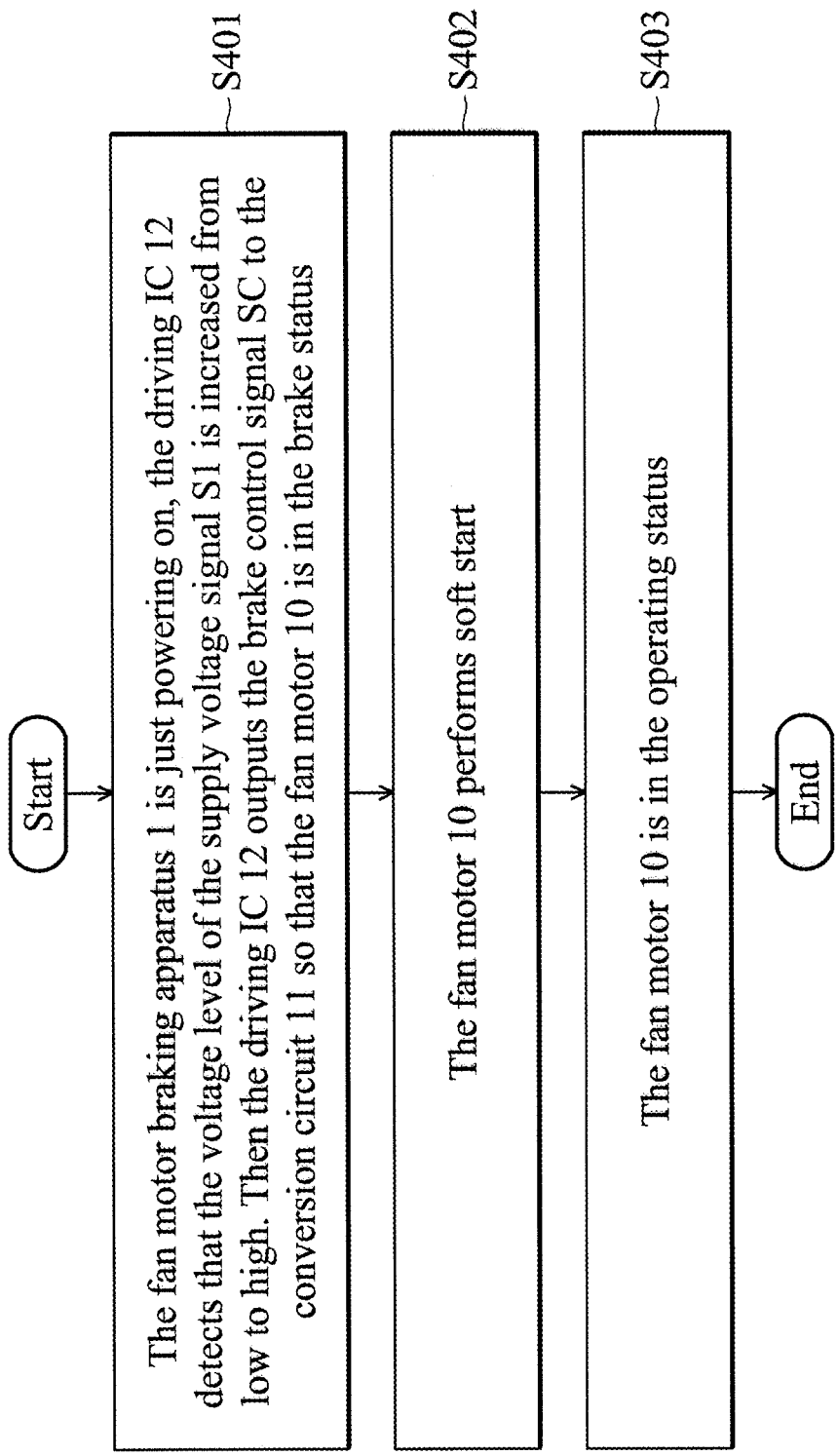
FIG. 4 shows a flow diagram of a control method in which a power-on mode is applied in the fan motor braking apparatus according to a fourth embodiment of the present disclosure.

FIG. 4 shows a flow diagram of a control method in which a power-on mode is applied in the fan motor braking apparatus 1 according to a fourth embodiment of the present disclosure. In step S401, the fan motor braking apparatus 1 is just powering on, the driving IC 12 detects that the voltage level of the supply voltage signal S1 is increased from low to high. At this time, the driving IC 12 outputs the brake control signal SC to the conversion circuit 11 (i.e. the voltage level of the brake control signal SC is increased from low to high (LO→HI)) so that the fan motor 10 is in the brake status. The control method proceeds to step S402, In step S402, the fan motor 10 performs soft start. In step S403, the fan motor 10 is in the operating status.

Figure 5A:
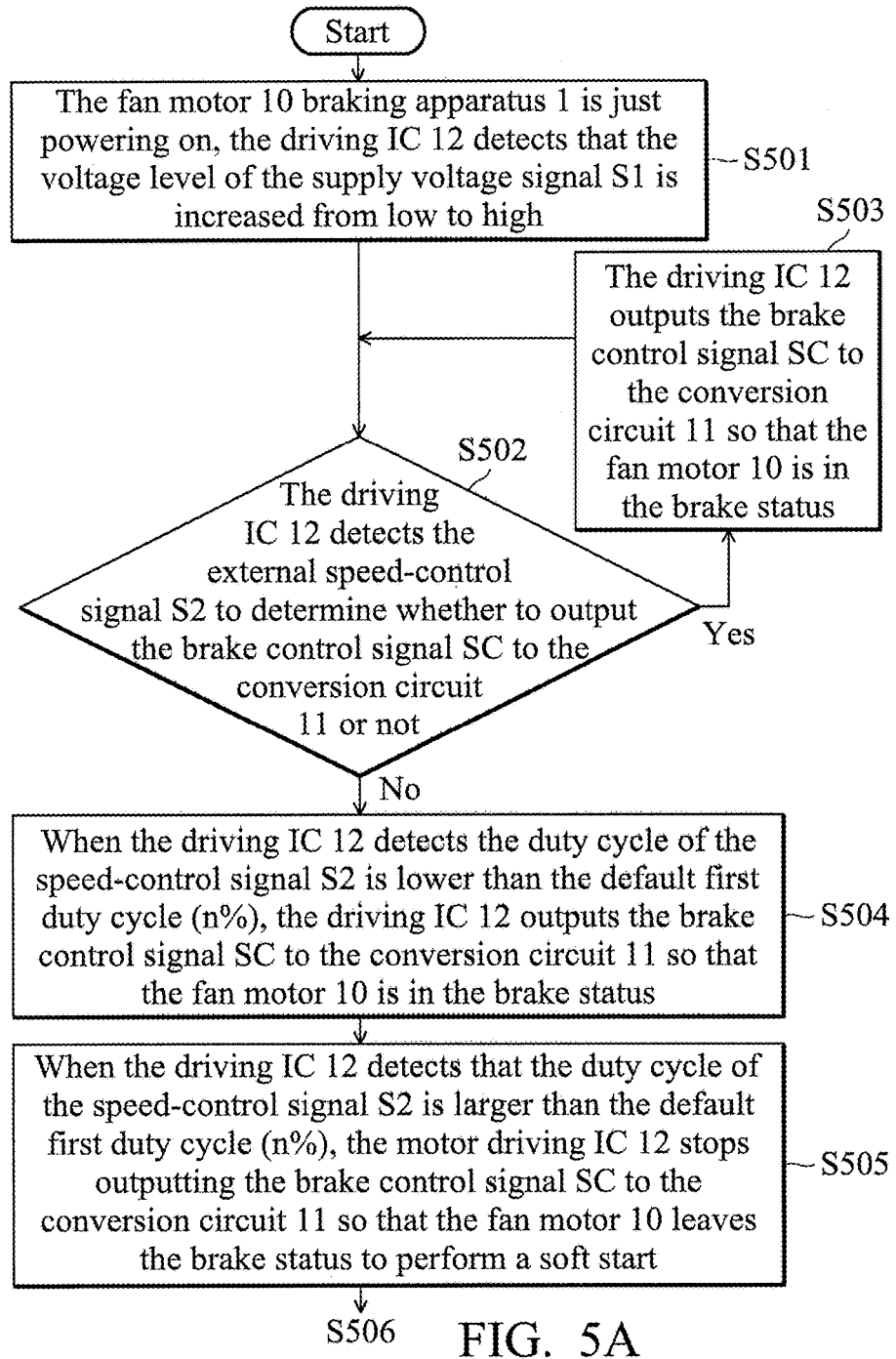
FIG. 5A and FIG. 5B show a flow diagram of a control method in which a Stop Stage is applied to the fan motor braking apparatus according to a fifth embodiment of the present disclosure.
Figure 5B:
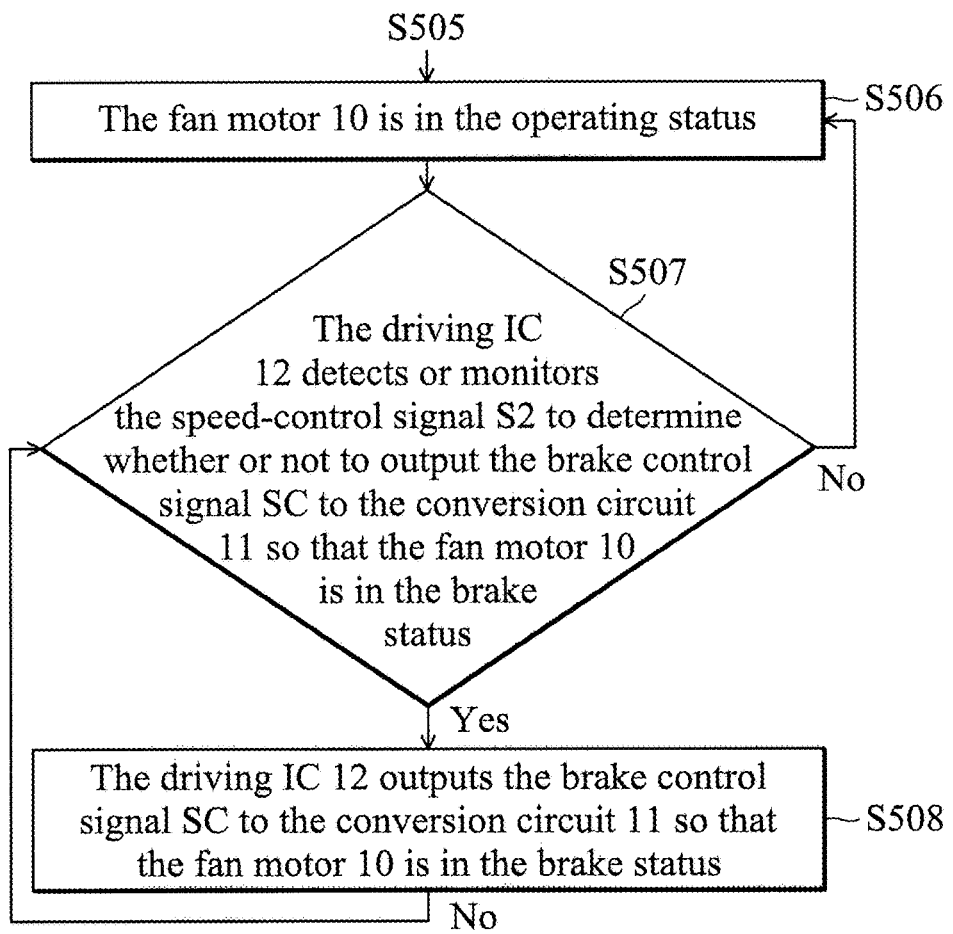

FIG. 5A and FIG. 5B show a flow diagram of a control method in which a Stop Stage (such as PWM Duty Cycle 0%~n %) is applied in the fan motor braking apparatus according to a fifth embodiment of the present disclosure. In step S501, the fan motor braking apparatus 1 is just powering on, the driving IC 12 detects that the voltage level of the supply voltage signal S1 is increased from low to high. The control method proceeds to step S502. In step S502, the driving IC 12 detects the external speed-control signal S2 to determine whether to output the brake control signal SC to the conversion circuit 11 or not. If yes, the control method proceeds to step S503; otherwise, the control method proceeds to step S504. In step S503, the driving IC 12 outputs the brake control signal SC to the conversion circuit 11 so that the fan motor 10 is in the brake status. Then the fan motor 10 leaves the brake status and the control method returns to step S502.

In step S504, when the driving IC 12 detects the speed-control signal S2 is 0 RPM or the duty cycle of the speed-control signal S2 is lower than n %, the driving IC 12 outputs the brake control signal SC to the conversion circuit 11 so that the fan motor 10 is in the brake status. In step S505, when the driving IC 12 detects that the duty cycle of the speed-control signal S2 is larger than the default first duty cycle (n %), the motor driving IC 12 stops outputting the brake control signal SC (Or the logic level or voltage level of the brake control signal SC output by the motor driving IC 12 changes from high to low) to the conversion circuit 11 so that the fan motor 10 leaves the brake status to perform a soft start. In step S506, the fan motor 10 is in the operating status and the control method proceeds to step S507.

In step S507, the driving IC 12 detects or monitors whether duty cycle of the speed-control signal S2 is lower than n % or not to determine whether or not to output the brake control signal SC to the conversion circuit 11 so that the fan motor 10 is in the brake status. If yes, the control method proceeds to step S508; otherwise, the control method returns to step S506.

In step S508, the driving IC 12 outputs the brake control signal SC to the conversion circuit 11 so that the fan motor 10 is in the brake status. Then the control method returns to step S507.

Figure 6:
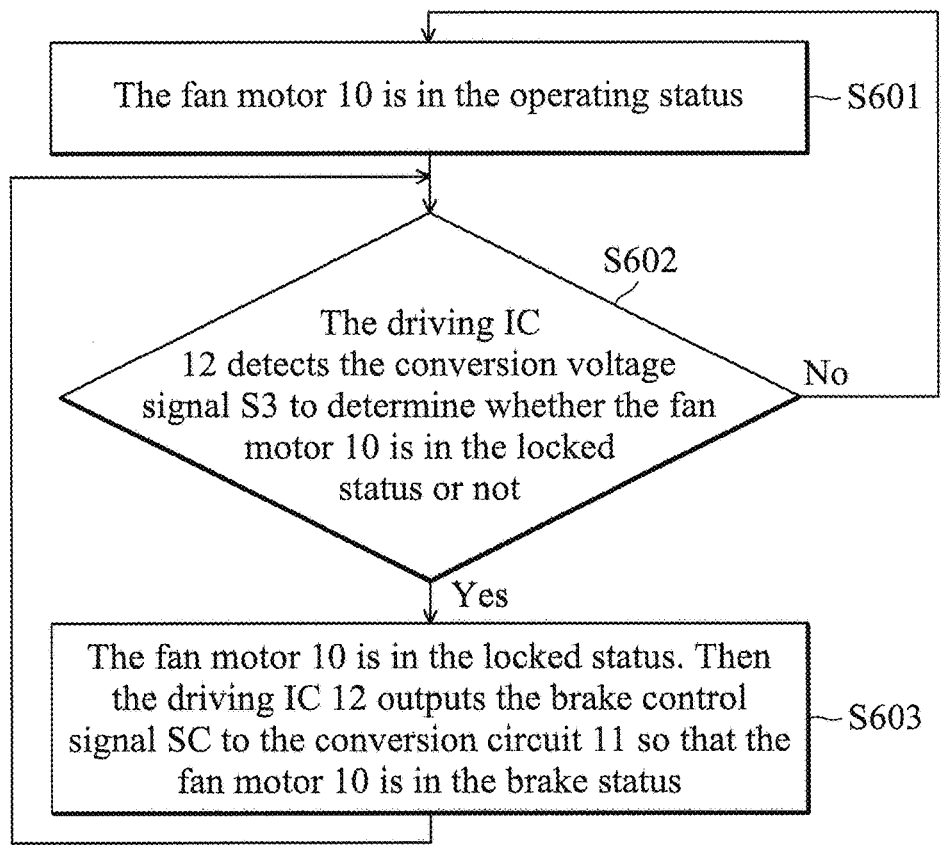
FIG. 6 shows a flow diagram of a control method in which a locked mode is applied to the fan motor braking apparatus according to a sixth embodiment of the present disclosure.

FIG. 6 shows a flow diagram of a control method in which a locked mode is applied in the fan motor braking apparatus according to a sixth embodiment of the present disclosure. In step S601, the fan motor 10 is in the operating status, then the control method proceeds to step S602. In step S602, the driving IC 12 detects the conversion voltage signal S3 to determine whether the fan motor 10 is in the locked status or not. If yes, the control method proceeds to step S603; otherwise, the control method returns to step S601. In step S603, the fan motor 10 is in the locked status. At this time, the driving IC 12 outputs the brake control signal SC to the conversion circuit 11 so that the fan motor 10 is in the brake status. Then the method returns to step S602.

Figure 7:
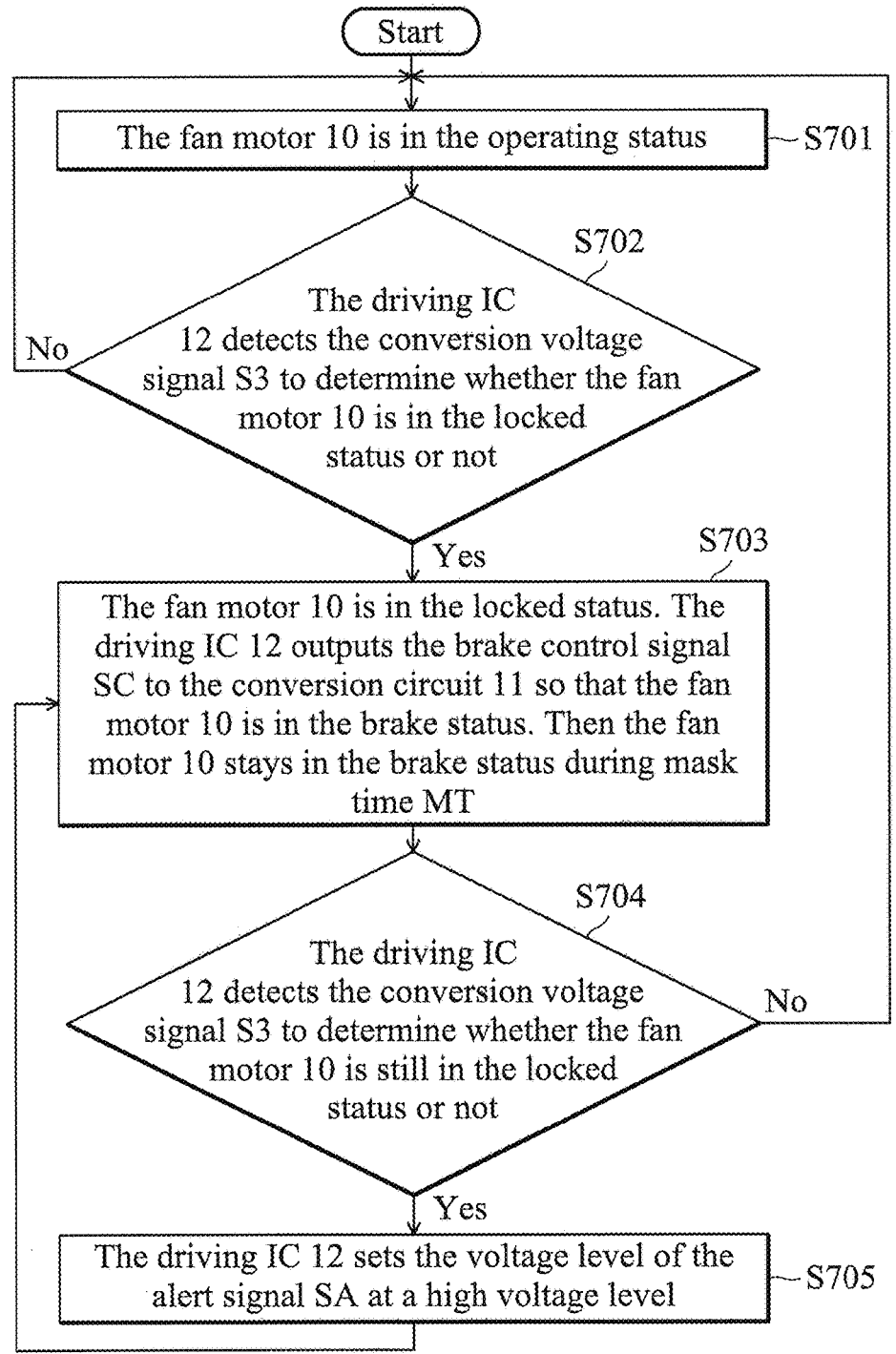
FIG. 7 shows a flow diagram of a control method in which a locked mode is applied in the fan motor braking apparatus according to a seventh embodiment of the present disclosure.

FIG. 7 shows a flow diagram of a control method in which a locked mode is applied in the fan motor braking apparatus according to a seventh embodiment of the present disclosure. In step S701, the fan motor 10 is in the operating status, then the control method proceeds to step S702. In step S702, the driving IC 12 detects the conversion voltage signal S3 to determine whether the fan motor 10 is in the locked status or not. If yes, the control method proceeds to step S703; otherwise, the control method returns to step S701.

In step S703, the fan motor 10 is in the locked status. At this time, the driving IC 12 outputs the brake control signal SC to the conversion circuit 11 so that the fan motor 10 is in the brake status. Then the fan motor 10 stays in the brake status during mask time MT. Then the control method proceeds to step S704. In step S704, the driving IC 12 detects the conversion voltage signal S3 to determine whether the fan motor 10 is still in the locked status or not. If yes, the control method proceeds to step S705; otherwise, the control method returns to step S701. In step S705, the driving IC 12 sets the voltage level of the alert signal SA at a high voltage level. Then the method returns to step S703.

For convenience of description, the fourth to seventh embodiments of the present invention adopt the fan motor braking apparatus 1 of the first embodiment, but the present invention is not limited thereto. A person skilled in art will understand that the control methods disclosed in the fourth to seventh embodiments of the present invention also can be applied to the fan motor braking apparatus 2 of the second embodiment, to the fan motor braking apparatus 3 of the third embodiment, and to related fan motor braking apparatuses.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

While the present disclosure has been described by way of example and in terms of preferred embodiment, it should be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A fan motor braking apparatus, comprising:
   a fan motor;
   a conversion circuit, electrically connected to the fan motor and comprising a plurality of bridge structures; and
   a motor driving IC, electrically connected to the conversion circuit and receiving at least one fan status signal, wherein after the fan motor starts operating, the motor driving IC determines whether the fan motor braking apparatus is in a brake status or not according to the at least one fan status signal;
   wherein when the fan motor braking apparatus is in the brake status, the motor driving IC outputs a brake control signal to the conversion circuit so that the bridge structures of the conversion circuit turn on to stop the fan motor;
   wherein the at least one fan status signal comprises an external speed-control signal or at least one conversion voltage signal from the fan motor;
   wherein when the motor driving IC detects the at least one conversion voltage signal has no change in voltage during a detection period, the motor driving IC informs the fan motor apparatus to be in the brake status, and after at least a mask time during which the fan motor stays in the brake status, the motor driving IC detects the at least one conversion voltage signal again, and if the at least one conversion voltage signal has no change in voltage again, the motor driving IC outputs an alert signal for indicating that the fan motor is in a locked status for a long time, which is longer than the mask time.

2. The fan motor braking apparatus of claim 1, electrically connected to a power source, the power source provides a supply voltage signal to the motor driving IC, wherein the motor driving IC determines whether the fan motor is on or not according to the supply voltage signal; and
   wherein when voltage level of the supply voltage signal is pulled from low to high by powering on the fan motor braking apparatus, the motor driving IC informs the fan motor braking apparatus to be in the brake status.

3. The fan motor braking apparatus of claim 1, wherein the external speed-control signal is a pulse width modulation signal;
   wherein when a duty cycle of the pulse width modulation signal is less than a default first duty cycle, the motor driving IC informs the fan motor braking apparatus to be in the brake status; and
   wherein the fan motor is a single-phase motor or a three-phase motor.

4. The fan motor braking apparatus of claim 1, wherein the external speed-control signal is a detection voltage signal;
   wherein when the speed-control signal is lower than a default first voltage, the motor driving IC informs the fan motor braking apparatus to be in the brake status; and
   wherein the fan motor is a single-phase motor or a three-phase motor.

5. The fan motor braking apparatus of claim 1, further comprising a first resistor, a second resistor and a third resistor electrically connected to the fan motor, wherein there is no Hall sensor installed in the fan motor;
   wherein the fan motor is a three-phase motor, and the at least one conversion voltage signal comprises a first conversion voltage signal, a second conversion voltage signal and a third conversion voltage signal; and
   wherein the motor driving IC obtains the first conversion voltage signal, the second conversion voltage signal and the third conversion voltage signal respectively sampled from the first resistor, the second resistor and the third resistor.

6. The fan motor braking apparatus of claim 1, further comprising a Hall sensor electrically connected to the motor driving IC, wherein the fan motor is a single-phase motor or a three-phase motor and the at least one conversion voltage signal is at least one Hall signal of the Hall sensor.

7. The fan motor braking apparatus of claim 1, further comprising a Hall sensor electrically connected to the motor driving IC, wherein the fan motor is a three-phase motor, and the at least one conversion voltage signal are a first Hall signal, a second Hall signal and a third Hall signal of the Hall sensor; and
   wherein when the motor driving IC detects the first Hall signal, the second Hall signal and the third Hall signal to determine that speed of the fan motor is lower than a default minimum fan speed, the motor driving IC informs the fan motor braking apparatus to be in the brake status.

8. The fan motor braking apparatus of claim 1, further comprising a Hall sensor electrically connected to the motor driving IC, wherein the fan motor is a single-phase motor, and the at least one conversion voltage signal is a first Hall signal of the Hall sensor; and
   wherein when the motor driving IC detects the first Hall signal to determine that the speed of the fan motor is lower than a default minimum fan speed, the motor driving IC informs the fan motor braking apparatus to be in the brake status.

9. A control method applied in a fan motor braking apparatus, the control method comprising:
   after a fan motor of the fan motor braking apparatus starts operating, receiving at least one fan status signal;
   determining whether the fan motor braking apparatus is in a brake status or not according to the at least one fan status signal;
   when the fan motor braking apparatus is in the brake status, outputting a brake control signal to a conversion circuit of the fan motor braking apparatus so that a plurality of bridge structures of the conversion circuit turn on to stop the fan motor, wherein the at least one fan status signal comprises an external speed-control signal or at least one conversion voltage signal from the fan motor;

wherein when the at least one conversion voltage signal is detected as having no change in voltage during a detection period, informing the fan motor apparatus to be in the brake status, and after at least a mask time during which the fan motor stays in the brake status, detecting the at least one conversion voltage signal again, and if the at least one conversion voltage signal has no change in voltage again, outputting an alert signal for indicating that the fan motor is in a locked status for a long time, which is longer than the mask time.

10. The control method applied in the fan motor braking apparatus of claim 9, wherein when the fan motor is on, determining whether the fan motor is on or not according to a supply voltage signal of the fan motor braking apparatus; and wherein when voltage level of the supply voltage signal is pulled from low to high, informing the fan motor braking apparatus to be in the brake status.

11. The control method applied in the fan motor braking apparatus of claim 9, wherein the external speed-control signal is a pulse width modulation signal;

wherein when a duty cycle of the pulse width modulation signal is less than a default first duty cycle, informing the fan motor braking apparatus to be in the brake status; and wherein the fan motor is a single-phase motor or a three-phase motor.

12. The control method applied in the fan motor braking apparatus of claim 9, wherein the external speed-control signal is a detection voltage signal;

wherein when the speed-control signal is lower than a default first voltage, informing the fan motor braking apparatus to be in the brake status; and wherein the fan motor is a single-phase motor or a three-phase motor.

13. The control method applied in the fan motor braking apparatus of claim 9, wherein there is no Hall sensor installed in the fan motor;

wherein the fan motor is a three-phase motor, and the at least one conversion voltage signal comprises a first conversion voltage signal, a second conversion voltage signal and a third conversion voltage signal; and wherein the first conversion voltage signal, the second conversion voltage signal and the third conversion voltage signal are respectively sampled from a first resistor, a second resistor and a third resistor of the fan motor braking apparatus.

14. The control method applied in the fan motor braking apparatus of claim 9, wherein the fan motor is a single-phase motor or a three-phase motor and the at least one conversion voltage signal is at least one Hall signal of the Hall sensor.

15. The control method applied in the fan motor braking apparatus of claim 9, wherein the fan motor is a three-phase motor, and the at least one conversion voltage signal is a first Hall signal, a second Hall signal and a third Hall signal of a Hall sensor of the fan motor braking apparatus; and wherein when the first Hall signal, the second Hall signal and the third Hall signal are detected to determine that the speed of the fan motor is lower than a default minimum fan speed, informing the fan motor braking apparatus to be in the brake status.

16. The control method applied in the fan motor braking apparatus of claim 9, further comprising a Hall sensor electrically connected to the motor driving IC, wherein the fan motor is a single-phase motor, and the at least one conversion voltage signal is a first Hall signal of a Hall sensor of the fan motor braking apparatus; and wherein when the first Hall signal is detected to determine that the speed of the fan motor is lower than a default minimum fan speed, informing the fan motor braking apparatus to be in the brake status.

\* \* \* \* \*